United States Patent [19]
Tippmann

[11] 3,848,475
[45] Nov. 19, 1974

[54] CONE TYPE FRICTION GEARING

[75] Inventor: Heinrich Tippmann, Munich, Germany

[73] Assignee: ITT Industries Inc., New York, N.Y.

[22] Filed: Apr. 17, 1973

[21] Appl. No.: 351,962

[30] Foreign Application Priority Data
Apr. 19, 1972 Germany.......................... 2219056

[52] U.S. Cl. ................................................ 74/192
[51] Int. Cl............................................ F16h 15/42
[58] Field of Search ............ 74/191, 192, 193, 199, 74/200, 201

[56] References Cited
UNITED STATES PATENTS

| | | | |
|---|---|---|---|
| 2,019,006 | 10/1935 | Ferrari................ | 74/201 |
| 2,881,622 | 4/1959 | Kraus.................. | 74/199 |
| 3,224,285 | 12/1965 | Maichen............... | 74/192 |
| 3,440,893 | 4/1969 | Heynau................ | 74/192 |

FOREIGN PATENTS OR APPLICATIONS
362,639  8/1938  Italy...................... 74/192

Primary Examiner—Samuel Scott
Assistant Examiner—Allan Russell Burke
Attorney, Agent, or Firm—Delbert P. Warner; James B. Raden

[57] ABSTRACT

This invention relates to a friction drive employing bevel wheels which are surrounded by a ring capable of being displaced for effecting the ridgeless or continuous variation or readjustment of the transmission ratio. Conventional types of friction drives operate with two stationary and two adjustable bevel wheels between which the freely movable friction ring is permitted to slide. According to the invention, the readjustable bevel wheels are omitted and replaced by a substantially more simple guide member provided with contact bearings. Trials have shown that the drives can be manufactured substantially more inexpensive and in a technically more perfect manner by maintaining the same or by achieving even a somewhat improved efficiency of the drives.

11 Claims, 7 Drawing Figures

CONE TYPE FRICTION GEARING

BACKGROUND OF THE INVENTION

1. Field of the Invention

The present invention relates to a friction drive employing bevel wheels which are encircled by a ring which is capable of being displaced on the bevel wheels for effecting the continuous or ridgeless adjustment or variation of the transmission ratio.

2. Discussion of the Prior Art

Friction drives employing two bevel wheels which are encircled by one ring, are already known. In order that the ring can be clamped around the bevel wheels, these bevel wheels must be of a very slim design. Owing to this design, however, the drive becomes very long and the range of adjustment between the greatest and the smallest transmission ratio becomes relatively small. A wedging effect cannot be utilized.

There are also known various other friction drives in which the ring is clamped between two pairs of mating bevel wheels, permitting a continuous variation of the transmission ratio by pushing towards each other the one pair of mating bevel wheels by simultaneously moving apart the other pair, or vice versa. This type of drive offers the advantage of having a large adjusting range, and the wedging effect of the ring between the bevel wheels can be well utilized for enlarging the transferable torque. In that case, however, all four bevel wheels require a separate bearing and at least two bevel wheels must be arranged displaceably, while each pair of mating bevel wheels must be rigidly connected to one another for the purpose of transferring the torque. Yet, this technical expenditure is deemed justified for meeting higher requirements.

SUMMARY OF THE INVENTION

It is the object of the invention to simplify the conventional types of friction drives and to make them more inexpensive without having to sacrifice the advantages of a large adjusting range and the possibility of utilizing the wedging effect. Therefore, the invention is aimed at providing a friction drive consisting of a smaller number of parts which are more simple in manufacture, and in which also the friction ring can be removed from its central position in a friction-less manner for transferring the torque.

According to the invention, this problem is solved in that the drive consists of a friction ring, of at least two bevel wheels rotatably supported inside the casing and engaging the friction ring from opposite sides, and of a guide member, with one or more bearings being arranged on respectively the other side of the friction ring as resting on the cone-shaped shell.

According to one embodiment of the invention the guide member is designed to be adjustable for effecting a change of the transmission ratio of the drive.

According to another embodiment of the invention it is proposed that the guide member as arranged between the bearings, is surrounded by the friction ring.

A further embodiment of the invention proposes that the friction ring is surrounded by the guide member as arranged between the bearings.

According to a still further embodiment of the invention it is proposed that the treads of the bearings are of a spherical (convex) design.

According to a still further embodiment of the invention it is proposed that the friction ring is of a spherical (convex) design on the sideway treads.

Moreover, it is proposed that the two bevel wheels between which the friction ring is running, have diameters differing from one another.

According to another embodiment of the invention the guide member is mounted to guide racks which, together with the guide member, are capable of being readjusted or displaced inside the casing.

A further embodiment of the invention proposes that the guide racks are firmly connected to the casing, and that the guide member is slidingly readjustable on said racks.

According to another embodiment of the invention it is proposed that inside the casing sliding surfaces are arranged on which correspondingly designed surfaces of the guide member rest and can be readjusted on the sliding surfaces by means of a transfer element rotatably supported inside the casing.

According to another embodiment of the invention it is proposed that the adjusting direction of the guide member inside the casing extends almost diagonally between the edges of the casing lying adjacent to the bearing points of the bevel wheels inside the casing.

According to a still further embodiment of the invention it is proposed that inside the casing several groups of bevel wheels arranged in tandem with each time one friction ring are combined with either one common or several individual guide members.

The invention has various advantages over the known prior art of friction drives. Owing to the particular design of the guide member, only a small number of parts are required for the drive arrangement by maintaining the same quality.

These parts are more simple and more economical in manufacture. By maintaining the same efficiency of the drive, the casing can be substantially reduced in its dimensions.

Owing to the fact that both the bevel wheel and the shaft are made in one piece, the two bearings of the shaft may be arranged at a greater spaced relation without thus increasing the overall dimensions of the casing. This, in turn, leads to a more stable bearing of the shaft.

The spacing between the driving and the driven shaft can be reduced substantially.

The particular type of embodiment of the guide member also provides an improved displaceability of the transmission ratio into faster or slower numbers of rotation. The friction ring can be designed narrower, so that the bevel wheels may overlap each other. A greater difference in the diameter of each individual bevel wheel results in a greater adjusting range. The spherical or convex design of the bearing treads or of the lateral surfaces of the friction ring will increase the efficiency of the drive.

BRIEF DESCRIPTION OF THE DRAWINGS

The invention will now be explained in greater detail hereinafter with reference to some examples shown in the accompanying drawings, in which.

DESCRIPTION OF PREFERRED EMBODIMENTS

Figure 1:
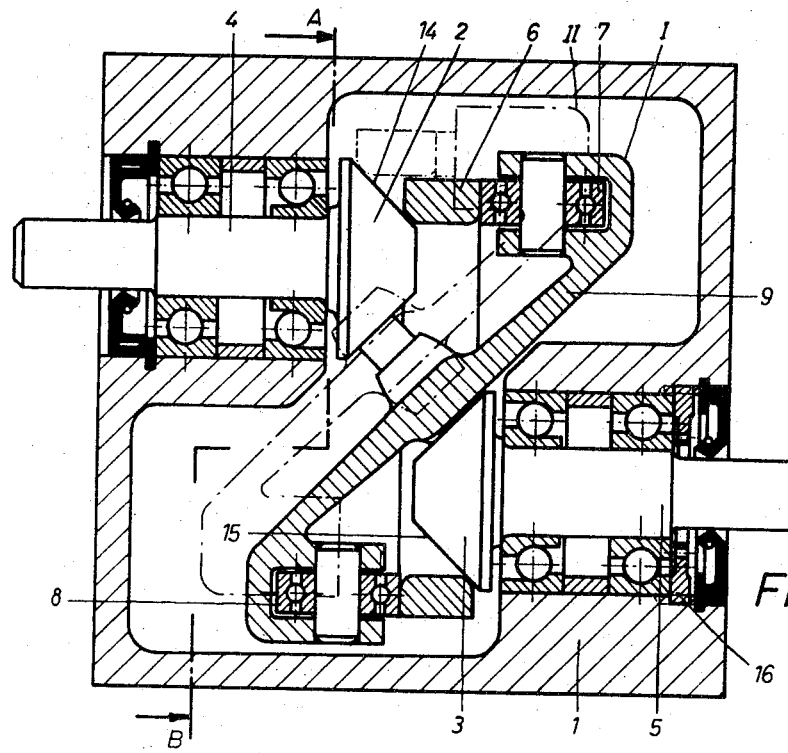
FIG. 1 shows a longitudinal section taken through the casing of a drive according to the invention.
Figure 2:
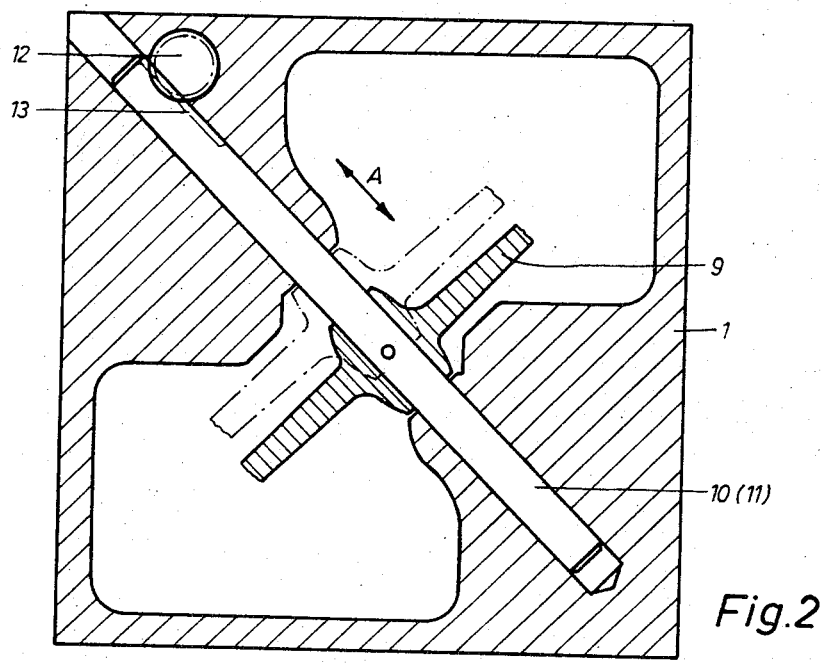
FIG. 2 shows a sectional view of the casing of the drive taken on line CD of FIG. 3, with the guide racks not shown in a sectional representation.

Referring now to FIG. 1, the reference numeral 1 indicates the casing. In this casing 1 the bevel wheels 2 and 3 are rotatably supported. The bevel wheels 2 and 3 and the shaft 4 or 5 are advantageously made in one piece respectively. The bevel wheels 2 and 3 are surrounded by a friction ring 6 which, by the two bearings 7 and 8, is being pressed against the cone-shaped shells of the bevel wheels 2 and 3. These bearings 7 and 8 are firmly connected to one another by means of one common guide member 9. This guide member 9 is displaceably arranged inside the casing 1 by means of the guide racks 10 and 11. For effecting displacement, an adjusting pinion 12 (FIG. 2) is actuated, which is in connection with the toothing 13 as provided on the guide racks 10 and 11. The transmission ratio is changed by displacing the guide member 9. The most favorable adjusting or shifting direction A is the one extending parallel in relation to the conical surfaces or tapers 14 and 15 almost diagonally between the edges of the casing 1. Deviations therefrom are conceivable as this has no substantial affect upon the functioning of the drive. In that case, however, the bearings 7 and 8 or the friction ring 6, or both parts must be designed to be correspondingly wide, because the bearings 7 and 8 and the friction ring 6 are moved in relation to one another.

The bearings 7 and 8 may be designed as normal ball bearings but it is also conceivable, however, to make the bearings 7 and 8 partly, or at least the contact or running surfaces (treads) thereof, from a suitable plastics material.

The solid line I shows the guide member 9 in the lowest adjusting position while the dot-and-dashline II shows the guide member 9 in its topmost adjusting position. The thread (screw) ring 16 serves the axial adjustment of the bevel wheel 3, with the guide member 9 automatically effecting the compensation with respect to the bevel wheel 2. Instead of the thread ring 16 it is also possible for correspondingly adapted fitting discs to take over this function.

Figure 3:
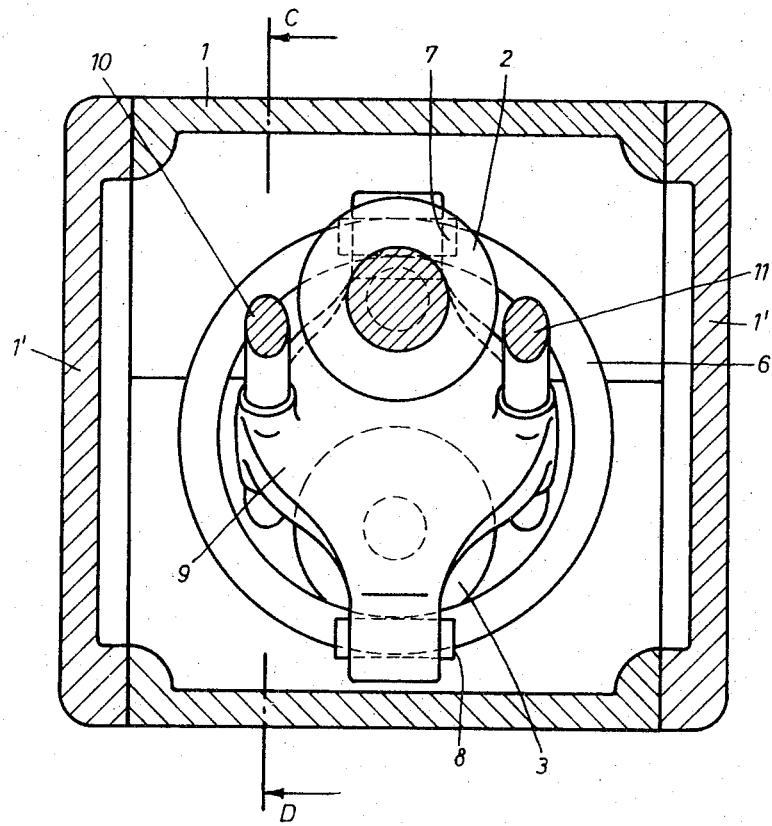
FIG. 3 shows a sectional view of both the casing and the drive taken on line AB of FIG. 1.

In FIG. 3 the casing 1 is shown in a sectional representation, with the section being taken on line AB of FIG. 1. The open lateral surfaces are covered by means of the covers or lids 1'.

Figure 4:
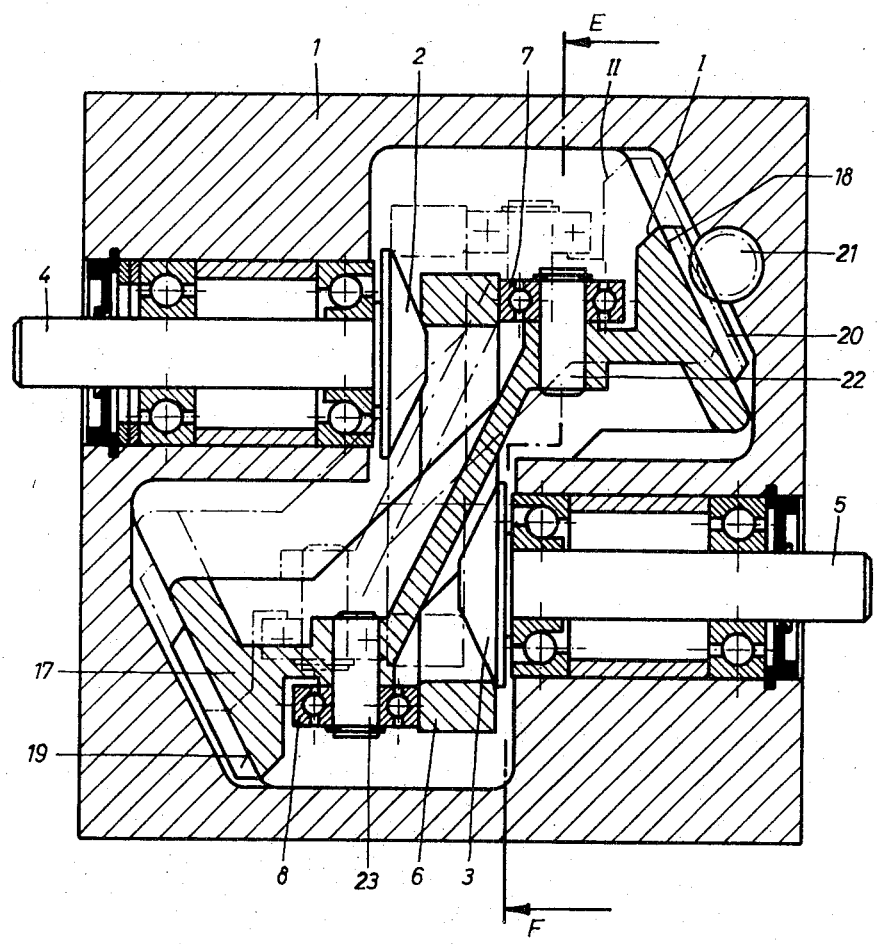
FIG. 4 shows a longitudinal section taken through the casing of a drive according to the representation of FIG. 1, in which one guide member is of a different design.

Another example is shown in FIG. 4. In this type of embodiment a guide member 17 is so designed as to be provided with sliding surfaces 18 and 19 at its two ends. Owing to this, the guide racks 10 and 11 as shown in the example according to FIGS. 1 to 3, may be omitted. Via the straight toothing 20 and the adjusting pinion 21 it is possible to effect the readjustment of the guide member 17. This type of construction, however, requires somewhat higher readjusting forces than the type of embodiment described hereinbefore, but is particularly stable and simple. The guide member 17, besides the bores for the axles 22 and 23 running in ball bearings, and the sliding surfaces 18 and 19 with the toothing 20, does not require any further shaping or fashioning by machine tool. The solid line I shows the guide member 17 in the lowest adjusting position, while the dot-and-dash-line II shows it in its top adjusting position. The direction of readjustment of the guide member 17 inside the casing 1 extends almost diagonally between the edges of the casing lying adjacent to the bearing points of the bevel wheels 2 and 3 inside the casing 1.

In the examples described and shown hereinbefore, the guide member 9 as arranged between the bearings 7 and 8, is surrounded by the friction ring 6.

Figure 5:
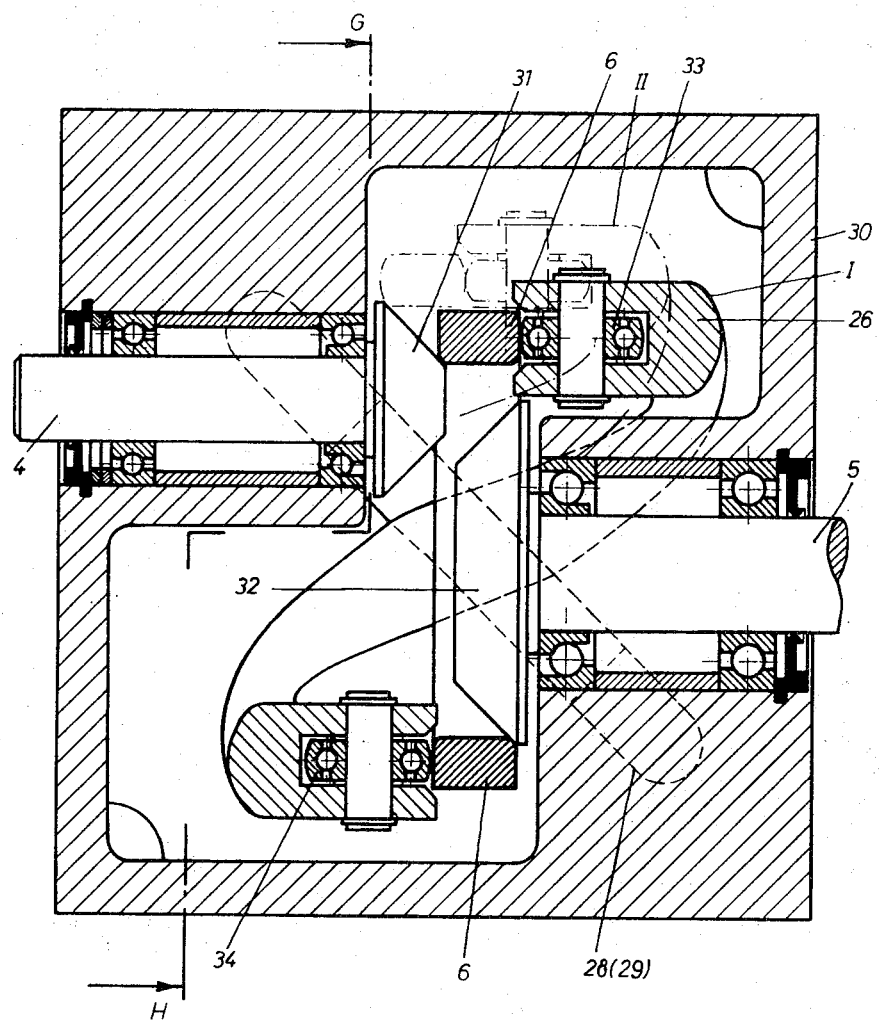
FIG. 5 shows a section taken through a drive casing according to FIG. 1, in which one guide member is of a different design, and with a modified design of the contact bearing tread.
Figure 6:
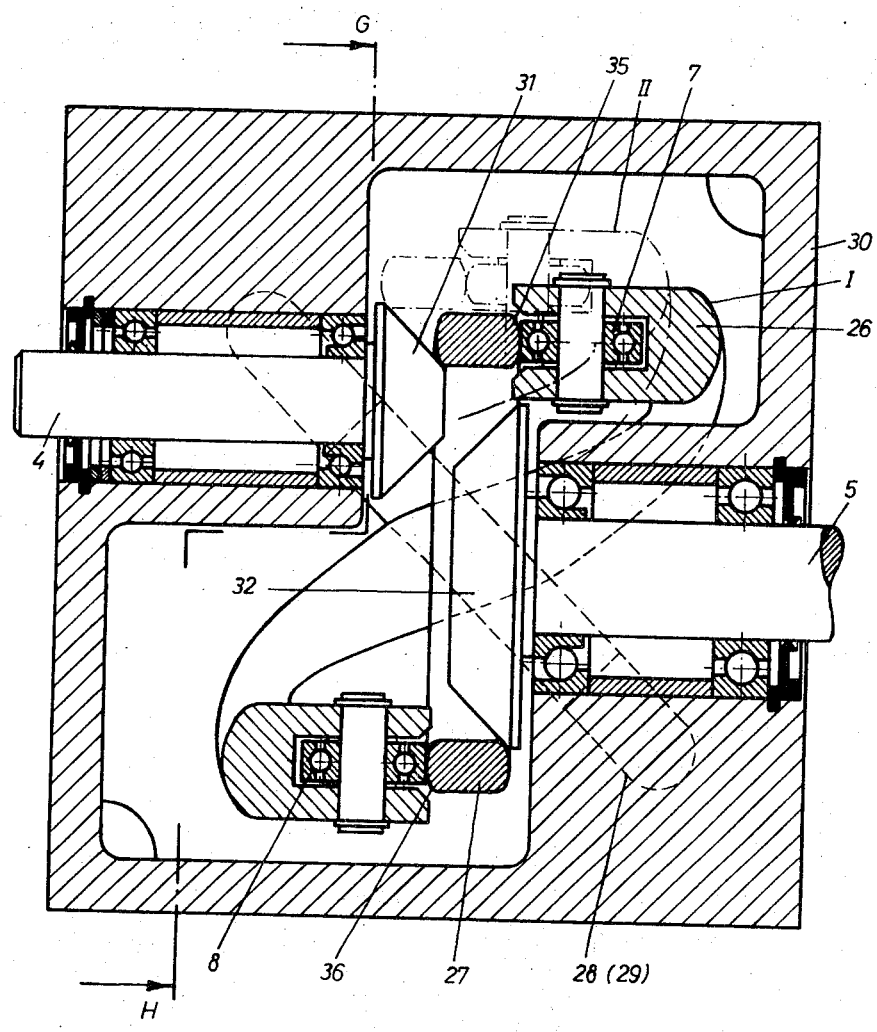
FIG. 6 shows a section similar to that shown in FIG. 5, in which the friction ring is designed differently.
Figure 7:
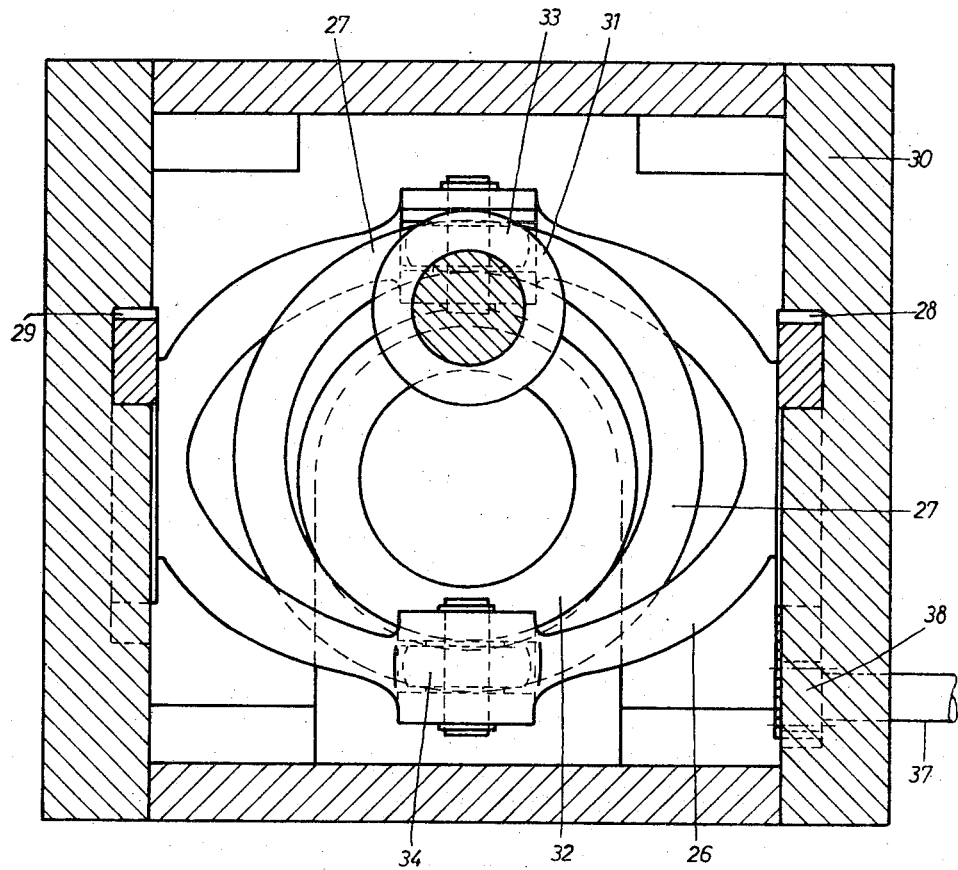
FIG. 7 shows a sectional view of the drive casing taken on line GH of FIGS. 5 or 6.

As a further example, there is shown the drive in FIGS. 5, 6 and 7. In order to allow the bevel wheels 31 and 32 to have a maximum size by maintaining the smallest distance between axles, the guide member 26 has in this case been given the shape of a ring extending on the outside over the friction ring 6 or 27, and being guided on the sliding surfaces 28 and 29 inside the casing 30.

This type of embodiment also shows bevel wheels of different size. The driving bevel wheel 31 is smaller than the driven bevel wheel 32. In this way there is achieved a displacement of the entire transmission ratio into the slow or, vice versa, into the quick which, in the case of a highspeed driving motor, saves a reduction gearing from having to be arranged subsequently to the continuously or ridgelessly adjustable drive.

In this type of embodiment (see FIG. 5) the bearings 33 and 34 are likewise designed spherically (convexly) in order to prevent the friction ring 6, in the case of a slightly inclined position, from running off one edge on the bearings. The alternative solution shown in FIG. 6 proposes that the end surfaces 35 and 36 of the friction ring 27 are designed spherically (convexly).

In this particular type of embodiment the friction ring 27 is surrounded by the guide member 26.

Displacement of the guide member 26 is effected, for example, via a pinion 38 mounted to the shaft 37, with the pinion engaging correspondingly designed edges or rim portions of the guide member 26, for displacing or adjusting the latter in the sliding surfaces 28 and 29 in the casing 30.

What is claimed is:

1. A continuously or ridgelessly adjustable friction drive, in which a friction ring is permitted to slide on coneshaped shell surfaces of bevel wheels for the purpose of adjusting the transmission ratio, comprising a friction ring, a casing, two bevel wheels rotatably supported inside the casing and having coneshaped shells engaging said friction ring from opposite sides, and a guide member supporting bearings arranged to engage respectively opposite sides of said friction ring causing it to press against the cone-shaped shell surfaces.

2. A friction drive according to claim 1, in which said guide member is designed to be adjustable for the purpose of changing the transmission ratio of the drive.

3. A friction drive according to claim 2, in which said guide member, as arranged between said bearings, is surrounded by said friction ring.

4. A friction drive according to claim 1, in which said friction ring is surrounded by said guide member as arranged between said bearings.

5. A friction drive according to claim 1, in which the treads of the bearings are of a spherical (convex) design.

6. A friction drive according to claim 1, in which the opposite sides of said friction ring are of a spherical (convex) design.

7. A friction drive according to claim 1, in which two of said bevel wheels between which said friction ring is running, have diameters differing from one another.

8. A friction drive according to claim 1, including guide racks upon which said guide member is mounted, and upon which the guide member may be readjusted or displaced inside the casing.

9. A friction drive according to claim 1, including guide racks which are firmly connected to said casing, and upon which said guide member is slidingly readjustable.

10. A friction drive according to claim 1, including sliding surfaces arranged in the casing, sliding surfaces on said guide member designed to rest against the sliding surfaces in the casing, and a transfer element rotatably supported inside the casing to enable adjustment of the position of the sliding surfaces.

11. A friction drive according to claim 1, in which the adjusting direction of the guide member inside said casing extends almost diagonally between the edges of the casing lying adjacent to the bearing point of said bevel wheels inside said casing.

* * * * *